United States Patent [19]
Numazawa et al.

[11] Patent Number: 5,497,941
[45] Date of Patent: Mar. 12, 1996

[54] SYSTEM FOR CONTROLLING THE TEMPERATURE OF THE AIR IN A CABIN FOR AN ENGINE-ELECTRIC MOTOR HYBRID CAR

[75] Inventors: Shigeo Numazawa, Nagoya; Takahisa Suzuki, Osaka, both of Japan

[73] Assignee: Nippondenso Co., Ltd., Kariya, Japan

[21] Appl. No.: 190,568

[22] Filed: Feb. 2, 1994

Related U.S. Application Data

[63] Continuation of Ser. No. 961,780, Oct. 14, 1992, abandoned.

[30] Foreign Application Priority Data

Oct. 14, 1991 [JP] Japan .................................. 3-264903
Sep. 28, 1992 [JP] Japan .................................. 4-258099

[51] Int. Cl.⁶ .................................................. G05D 23/00
[52] U.S. Cl. ............................ 237/2 A; 219/205; 165/43
[58] Field of Search .............................. 237/2 A, 12.3 A, 237/12.3 B; 126/101 C; 219/205; 165/42, 43

[56] References Cited

U.S. PATENT DOCUMENTS 4,308,994  1/1982  Perhats .............................. 237/12.3 b

FOREIGN PATENT DOCUMENTS 45-16989  7/1970  Japan .
59-43967  3/1984  Japan .

*Primary Examiner*—William E. Tapolcal
*Attorney, Agent, or Firm*—Cushman, Darby & Cushman

[57] ABSTRACT

A vehicle is provided with both an electric motor and an internal combustion engine for operating the vehicle. The vehicle is further provided with a duct for discharging air into a cabin of the vehicle for controlling the temperature of the air as discharged. A heater core is arranged in the duct for heating the air passing through the duct. A sensor 9 is provided for detection of the temperature of the cooling water of the engine. When the vehicle is operated by the electric motor, the heat taken from the engine cooling water is supplied to the heat exchanger for heating the air passing through the duct when the temperature of the engine cooling water is higher than a predetermined value.

25 Claims, 11 Drawing Sheets

SYSTEM FOR CONTROLLING THE TEMPERATURE OF THE AIR IN A CABIN FOR AN ENGINE-ELECTRIC MOTOR HYBRID CAR

This is a continuation of application Ser. No. 07/961,780, filed on Oct. 14, 1992, which was abandoned upon the filing hereof.

BACKGROUND OF THE INVENTION

1. Field of the Invention

The present invention relates to an air conditioning system for an automobile for controlling the temperature of a cabin of an automobile operated selectively by an electric motor or by an internal combustion engine.

2. Description of Related Art

Known in the prior art is a so-called hybrid car that includes, for driving the car, both an electric motor and an internal combustion engine, wherein the electric motor is operated when in an urban area, and the internal combustion engine is operated when the car is in a suburb an area when the battery is low. In such a hybrid car, a heating operation for the cabin of the vehicle depends on the power source as selected. Namely, when the electric motor operates the automobile, the compressor is powered and driven by the electric battery. A condenser, which is arranged in an air duct so as to form a refrigerating cycle together with the compressor, operates as a heating device such that a heat exchange takes place between the condenser and the air passing through the duct so as to heat the air in the duct, which is discharged into the cabin for heating thereof. Otherwise, an electric heater is operated so that the air flowing in the duct is heated, which is discharged into the cabin for heating thereof. When the vehicle is operated by the internal combustion engine, a heater core, which is arranged in the duct, is supplied by hot, engine cooling water taken from an engine cooling water line that is subjected to a heat exchange with the air passing through the duct for heating thereof.

When the vehicle is driven by an electric motor, with the internal combustion engine not operating, the compressor is supplied by the battery assembly in such a manner that a so-called heat pump operation of a refrigerating cycle is obtained for heating the cabin. In this case, a low atmospheric air temperature results in the reduction of the efficiency of the heat pump causing electric power consumption to increase, which results in a reduction in travelling distance. The use of the electric heater in place of the above mentioned heat pump operation may usually further increase electric power consumption because the heating efficiency as obtained by the electric heater is lower than that obtained by the heat pump operation.

SUMMARY OF THE INVENTION

An object of the present invention is to provide a heating system for an automobile capable of heating the cabin when the internal combustion engine is not operating without substantially increasing electric power consumption.

According to the present invention, a vehicle having a cabin to be temperature controlled, said vehicle comprising:

a battery for generating electric power;

an electric motor connected to the battery;

a water cooled internal combustion engine;

the engine being provided with a water recirculation line for promoting a heat exchange between engine cooling water and external air for cooling the engine;

the rotational movement at least from the electric motor being used for moving the vehicle;

a duct having one end for introduction of the air and a second end opened to the cabin of the vehicle for discharging the air thereinto, and;

a heat exchanging means cooperating with the engine cooling water in the engine cooling water recirculation line for increasing the temperature of the air discharged into the cabin from said second end of the duct when the battery operates the electric motor for driving the vehicle.

BRIEF EXPLANATION OF ATTACHED DRAWINGS

FIG. 1 a schematic representation of a concept of a hybrid car operated by an internal combustion engine and an electric motor.

DESCRIPTION OF PREFERRED EMBODIMENTS

Figure 1:
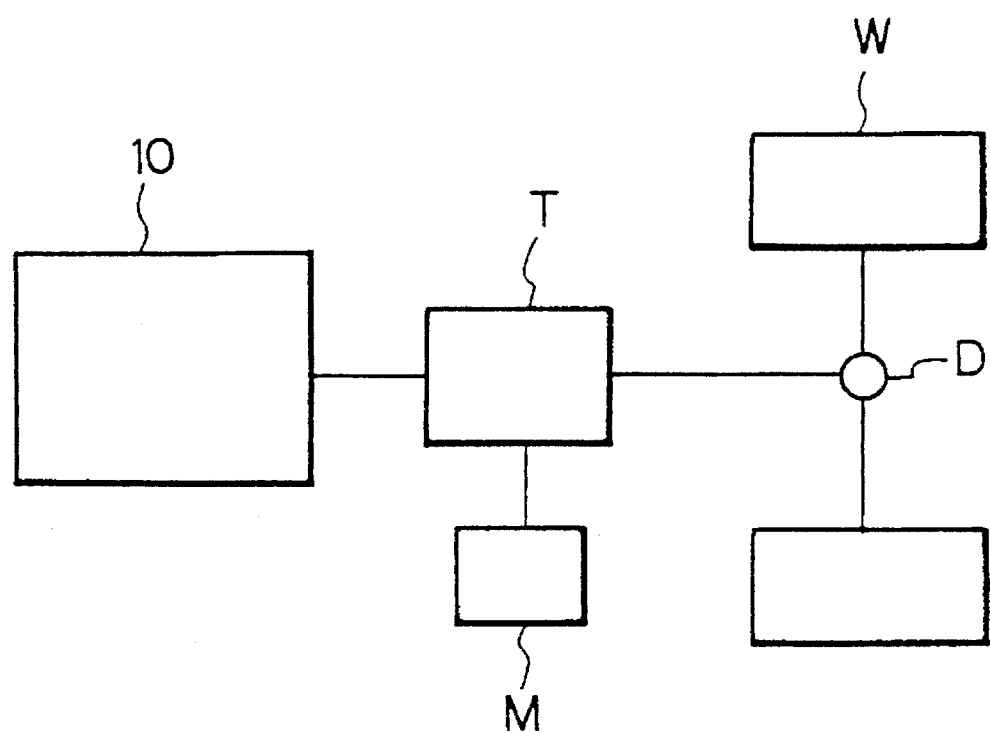

FIG. 1 schematically shows an example of a hybrid car with an internal combustion engine 10 and an electric motor M that are connected to a transmission T, which has an output shaft connected via a differential mechanism D, to drive wheels W.

Figure 2:
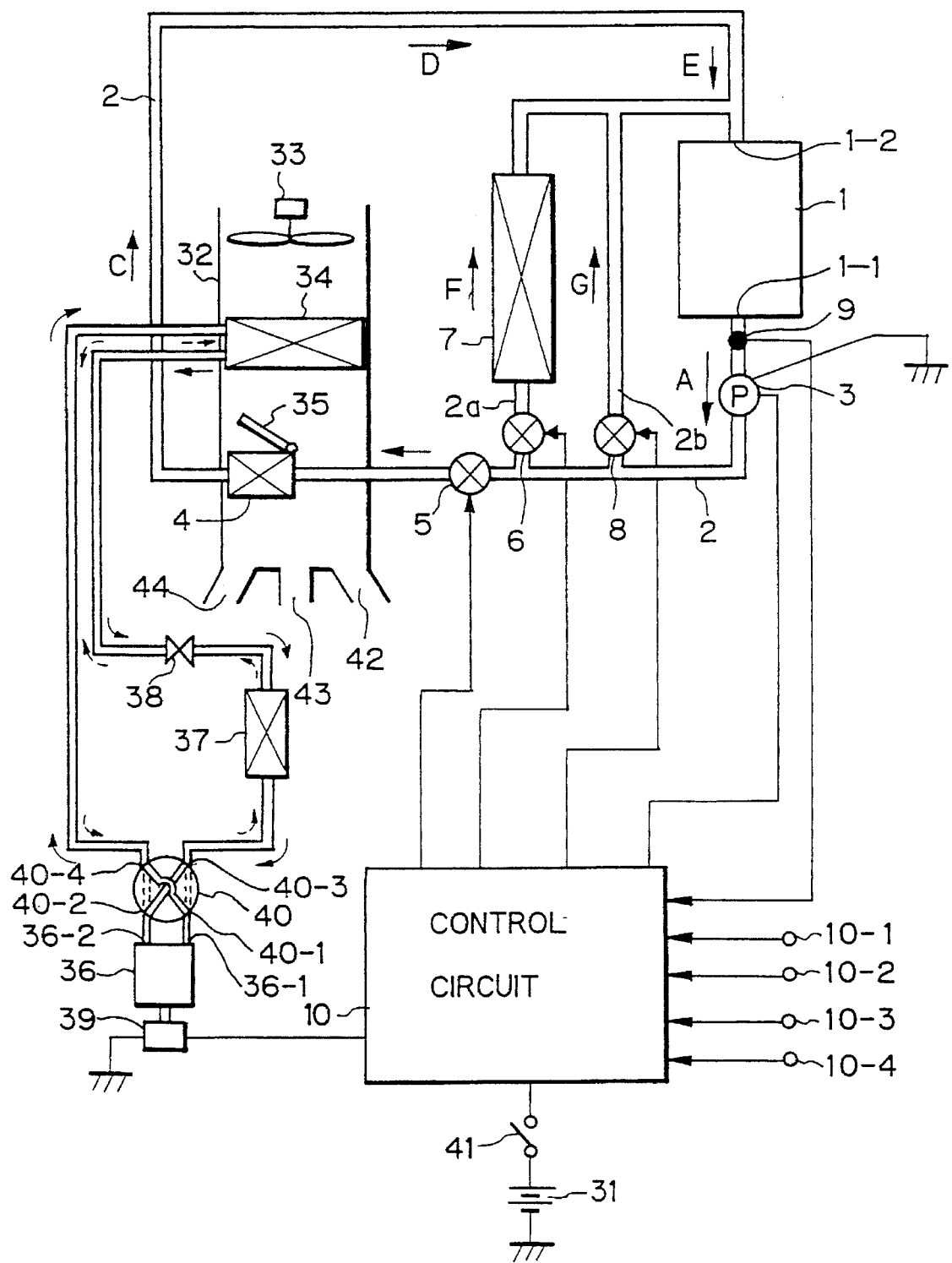
FIG. 2 is a diagrammatic view of a air conditioning system in the first embodiment of the present invention.

FIG. 2 shows generally and diagrammatically an entire air conditioning system for an automobile of a first embodiment, which is directed to an electric car that is operated basically by an electric motor but is also provided with an internal combustion engine 1. In this type of electric car provided with an internal combustion engine 1, a basic operation is such that, in order to drive wheels W (FIG. 1), an electric motor M (FIG. 1) supplied by a battery unit 31 is used when the vehicle is operated in urban area, and the internal combustion engine 1 is used when the vehicle is operated in a suburb an area or when the battery 31 is dead. As will be seen later, in this embodiment heat that is provided by the engine itself or heat that is generated by cooling water just after the operation of the same by the internal combustion engine 1 is used for heating a cabin of the vehicle when driven by an electric motor.

In FIG. 2, the internal combustion engine 1 is provided therein with a water jacket (not shown) in which engine cooling water flows. The water jacket is provided with an outlet 1—1 that is connected to an end of a main or recirculation pipe 2, on which a water pump 3 is provided for obtaining a forced water flow. The other end of the recirculation pipe 2 is connected to an inlet 1-2 for creating a recirculated flow of the engine cooling water. A heater core 4 is located on the pipe 2 for obtaining a heat exchange between the water and a flow of air, as will be fully explained later. Also located on the main pipe 2 is a first valve 5 situated upstream of the heater core 4 for controlling the flow of water in the pipe 2. A first by-pass pipe 2a is connected to the main pipe 2 so that it by-passes the engine, on which a second control valve 6 and a radiator 7 are located. The first by-pass passageway 2a is upstream and connected to the main pipe 2 at a location upstream of the first control valve 5. The radiator 7 is located downstream of the second control valve 6. A second by-pass pipe 2b is connected to the main pipe 2 so that it by-passes the engine 1. The second by-pass is, at its upstream end, connected to the main pipe 2 at a location downstream of the water pump 3 and upstream of the point where the first by-pass pipe 2a is connected to the main pipe 2. A third control valve 8 is located on the second by-pass pipe 2b. A reference numeral 9 is a sensor for detection of the temperature of the engine cooling water that is arranged directly downstream of the outlet port 1—1 of the engine water jacket.

A control circuit 10 as a microcomputer system is supplied by the battery 31 via an ignition switch 41, and is connected to various sensors including, in addition to the water temperature sensor 9 as already explained, a sensor 10-1 for detection of the air temperature inside the cabin, a sensor 10-2 for detection of the air temperature outside the vehicle, and a sensor 10-3 for detection of the amount of sun radiation. A setter 10-4 is also connected to the control circuit for introducing various setting values. The control circuit 10 is connected to the pump 3, and the first, second and the third valves 5, 6 and 8, and executes a calculation based on the signal from the sensors 10-1, 10-2 and 10-3, and the setter 10-4 for producing signals directed to the pump 3, and the first, second and the third valves 5, 6 and 8, so that positions of these valves 5, 6 and 8 are controlled so that a first recirculation line for obtaining a flow along the arrows A, B, C, D and E, are second recirculation line for obtaining a flow as shown by the arrows A and F, and a third recirculation line for obtaining a flow as shown by the arrows A and G are exclusively, or in combination, obtained in accordance with respective setting positions of the first, second and third control valves 5, 6 and 8. Such switching is basically carried out in accordance with the temperature of the engine cooling water determined by the sensor 9.

When the temperature of the engine cooling water is higher than a predetermined first temperature of, for example, 40° C., the control circuit 10 opens the first valve 5, and closes the second and third valves 6 and 8, so that the first recirculating circuit as shown by the arrow A, B, C, D and E is obtained. When the temperature of the engine cooling water is higher than a second predetermined value larger than the first predetermined value, because the engine is operating under high load conditions, the control circuit 10 opens the first and second valves 5 and 6, and closes the third valve 8, so that the first recirculation circuit as shown by the arrow A, B, C, D and E together with the second recirculation circuit as shown by an arrow F are obtained, thereby allowing the engine cooling water to pass through the radiator 7 and discharge the heat in the cooling water so as to prevent the engine from overheating. When it is required that the temperature of the engine cooling water not be greatly reduced, the second control valve 6 has a reduced degree of opening and the third control valve 8 has an increased degree of opening, so that a reduction in the amount of water flow passing the first by-pass passageway 2a is obtained owing to the corresponding increase in the amount of water directed to the second by-pass passageway 2b as shown by the arrow G, which reduces the cooling effect at the radiator 7, which in turn prevents the temperature of the engine cooling water from dropping.

Furthermore, the water pump 3 for producing the forced flow of water in the first, second and third recirculation passageways is, in this embodiment, electrically operated by a signal from the microcomputer and has a power consumption of about 50 to 100 watts.

A reference numeral 32 is a duct in which a flow of air for air conditioning is created, which is subjected to a heat exchange with the heater core 4 arranged in the duct 32. The duct 32 has an upstream end for the introduction of external air or air inside the cabin and a downstream end that has a defroster outlet 42 for discharging an air flow upward at a location near the base of the windshield (not shown), an upper outlet 43 for discharging an air flow mainly toward the upper portion of a passenger, and a lower outlet 44 for discharging air flow mainly toward the lower portion of a passenger. An electrically operated fan 33 is arranged in the duct 32 at a position adjacent to the upstream end. Between the fan 33 and the heater core 4, an inner heat exchanging device 34 is arranged for cooling or heating the air flow from the fan 33. An air mix damper 35 is located upwardly from the heater core 4 for controlling a ratio of the amount of air passing through the heater core 4 over the total amount of air passing through the duct 32.

As is well known, the inner heat exchanger 34 arranged in the duct 34 creates a refrigerating cycle of a cooling medium together with a compressor 36, an outer heat exchanger 37 arranged for promoting a heat exchange with outside air, and a pressure reduction device 38 for obtaining a reduction in the pressure of the refrigerating medium. As is also well known, the compressor 36 has an outlet 36-1 of the air and an inlet 36-2 of the air and is connected to an electric motor 39 receiving a signal from the control circuit 10 for imparting a rotational movement to the compressor 36 when it is required.

A four port, two position switching valve 40 is provided, which has a first port 40-1 connected to the outlet 36-1 of the compressor 36, a second port 40-2 connected to the inlet 36-2 of the compressor 36, a third port 40-3 connected to the outside heat exchanger 37, and a fourth port 40-4 connected to the inside heat exchanger 34. The switching valve 40 is moved between a "heater position" as shown by a solid line where the first port 40-1 is connected with the fourth port 40-4 and the second port 40-2 is connected with the third port 40-3, so that a flow of the refrigerating medium from the compressor 36 as shown by a solid arrow is obtained via the inside heat exchanger 34, the pressure reduction device 38, and the outside heat exchanger 37, so that the inside heat exchanger 34 operates as a heater for heating the air flow in the duct 32, and a "cooler position" as shown by a dotted line where the first port 40-1 is connected with the third port 40-3 and the second port 40-2 is connected with the fourth port 40-4, so that a flow of the refrigerating medium from the compressor 36, as shown by dotted arrows, is obtained via the outside heat exchanger 34, the pressure reduction device 38, and the inside heat exchanger 37, so that the inside heat exchanger 34 operates as a cooler for cooling the air flow in the duct 32.

Figure 3:
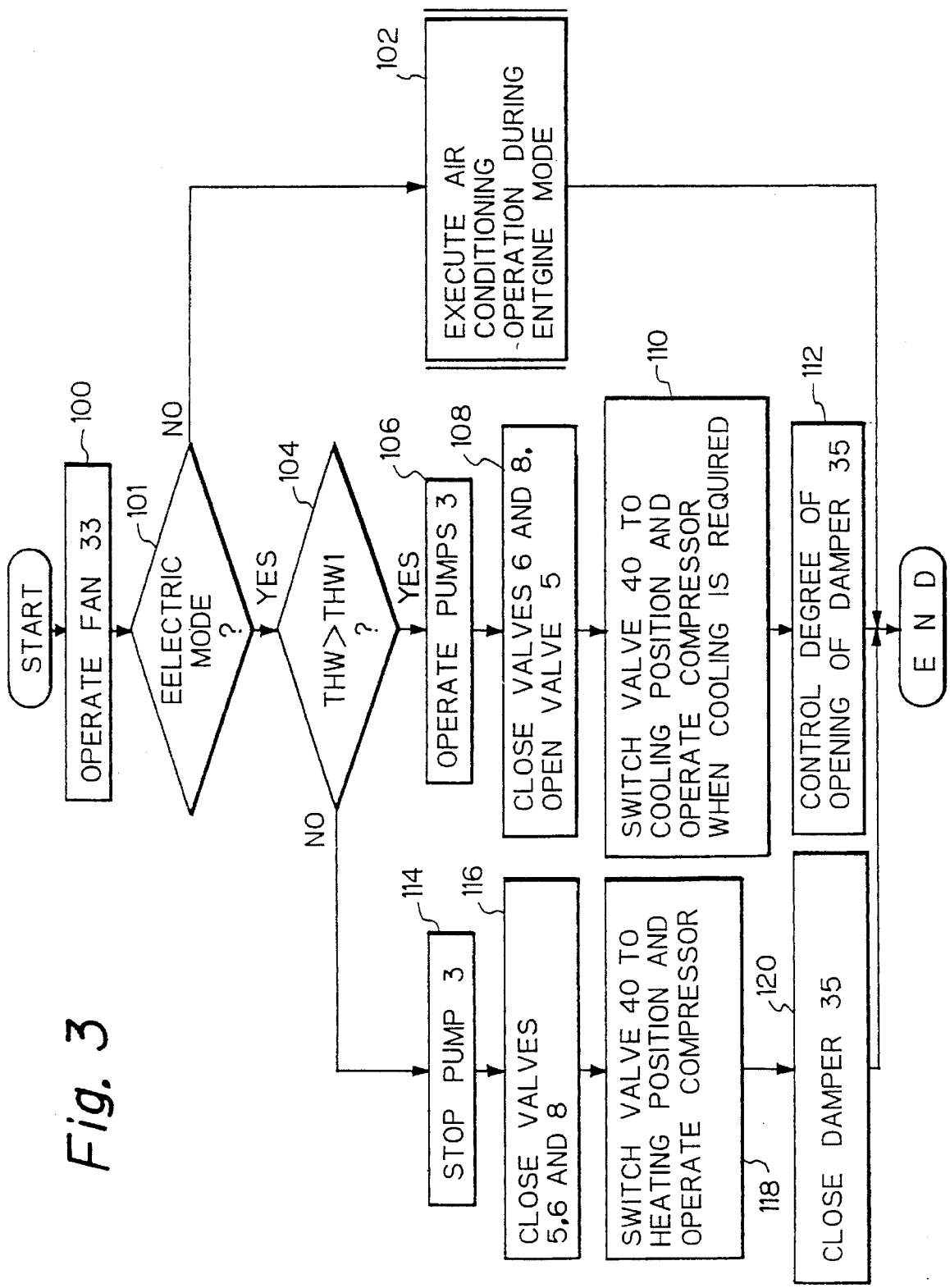
FIG. 3 is a flow chart illustrating how the system in FIG. 2 operates.

The operation of the first embodiment will now be explained, while referring to a flow chart in FIG. 3, which illustrates generally how the temperature control is carried out. During the air conditioning operation, the fan 33 is operated for generating the flow of air in the duct 32 (step 100). At step 101, it is determined if the vehicle is under the electric mode and operated by the electric motor M. When the ignition key switch 41 is turned ON for operating the internal combustion engine for vehicle operation thereby (no result at step 101), the heating operation of the cabin is carried out by introducing an air flow into the heater core 4. Namely, the cooling water in the engine 1 has a temperature sufficiently high for the cooling water in the heater core 4 to heat the air passing the duct 32 toward the cabin. In order to obtain an air conditioning operation, the compressor 36 is operated and the switching valve 40 is switched to the dotted position for obtaining the refrigerating cycle such that the inner heat exchanger 34 acts as an evaporator for cooling the air flow. The degree of opening of the air mix damper 35 is controlled in accordance with the desired room temperature. Step 102 generally shows an air conditioning operation when the vehicle is operated by the engine 1, and is not related to the present invention. Therefore, a detailed explanation thereof will be omitted.

Contrary to this, when the wheels of the vehicle are operated by the electric motor M (yes result at step 101), the heating of the cabin is carried out selectively by introducing the engine water into the heater core 4 when the temperature of the engine cooling water is still high or by introducing a flow of air from the compressor 36 into the inside heat exchanging device 34 after the temperature of the engine cooling water is lowered. Namely, at step 104, the signal from the sensor 9 is input, and it is determined if the detected temperature THW of the engine cooling water is higher than a predetermined value THW1. When it is determined that THW>THW1, the microcomputer 3 issues a signal to operate the water pump 3 (106) so that the engine cooling water that is still hot is introduced into the heater core 4. In this case, the second and the third valves 6 and 8 are closed, while the first valve 5 is opened, which allows air having a higher temperature to be discharged into the cabin (step 108). In order to obtain a cooling operation, the switching valve 40 is switched to the "cooler position" as shown by the dotted line so as to create the recirculated flow as shown by the dotted arrows, and the compressor 36 is operated so that the inside heat exchanger 34 operates as an evaporator for cooling the temperature of the air contacted therewith (step 110). The air mix damper 35 is controlled so as to obtain a desired degree of opening for controlling the amount of cooled air into the heater core 4, which allows the temperature of the air discharged into the cabin to be controlled in accordance with the degree of the opening of the air mix damper 35 (step 112).

When the temperature of the air introduced into the duct 32 is not very low, the thermal load at the heater core 4 is not very high. In this case, the degree of opening of the first control valve 5 is, at step 108, reduced to lower the amount of cooling water introduced into the heater core 4, which prevents the temperature of the engine cooling water from being quickly lowered. In other words, it is possible to keep the cooling water at a high temperature after the engine has stopped.

When it is determined that the sensor 9 detects that the temperature THW of the engine cooling water is lower than the predetermined value THW1 (no result at step 104), the microcomputer determines that it is impossible to carry out a heating operating using the heat from the engine cooling water. In this case, the electric water pump 3 is de-energized (step 114), the control valves 5, 6 and 8 are closed (step 116), the switching valve 40 is switched to the "heater position" as shown by the solid line so as to create the flow of refrigerant as shown by the solid arrows while the compressor 36 is operated (step 118), and the air mix damper 35 is operated so that it fully closes the heater core 4 (step 120). As a result, the inside heat exchanger 34 that receives heated air from the compressor 36 is operated as a heater (so called heat pump) for heating the air introduced into the duct 32, which is discharged into the cabin via the outlet 42, 43 or 44 as selected. It should be noted that, when a heating operation is performed by the inside heat exchanger 34, the electric power consumed by the motor 39 for operating the compressor 36 is in a range between about 1,000 watts to 1,500 watts. At an engine cooling water temperature THW lower than the predetermined value THW1, in place of the heat exchanger 34, an electric heater having a rated power of 1,000 watts can be employed.

It should be noted that, control of the water pump 3 when the engine cooling water is used for air temperature control in the duct (step 106) and/or control of the degree of opening of the valves 5, 6 and 8 (step 108) can be performed by the microcomputer 10 in accordance with various detected parameters such as the inner air temperature detected by the sensor 10-1, the outer air temperature detected by the sensor 10-2, the amount of sun radiation detected by the sensor 10-3 and the setting of the temperature by the setter 10-4.

As described above, the first embodiment employs heat from the engine cooling water as a heat source for an temperature control when it is hot, so that only about 50 watts to about 100 watts is consumed by the electric pump 3, which can reduce the amount of electric power consumption by the battery 31, which can increase the efficiency of the vehicle when it is moving. Furthermore, in the first embodiment, the engine cooling water is used as a heat source to heat the cabin only when the temperature of the engine cooling water is high, which can eliminate the problem that occurs when the engine cooling water having a reduced temperature is used.

Figure 4:
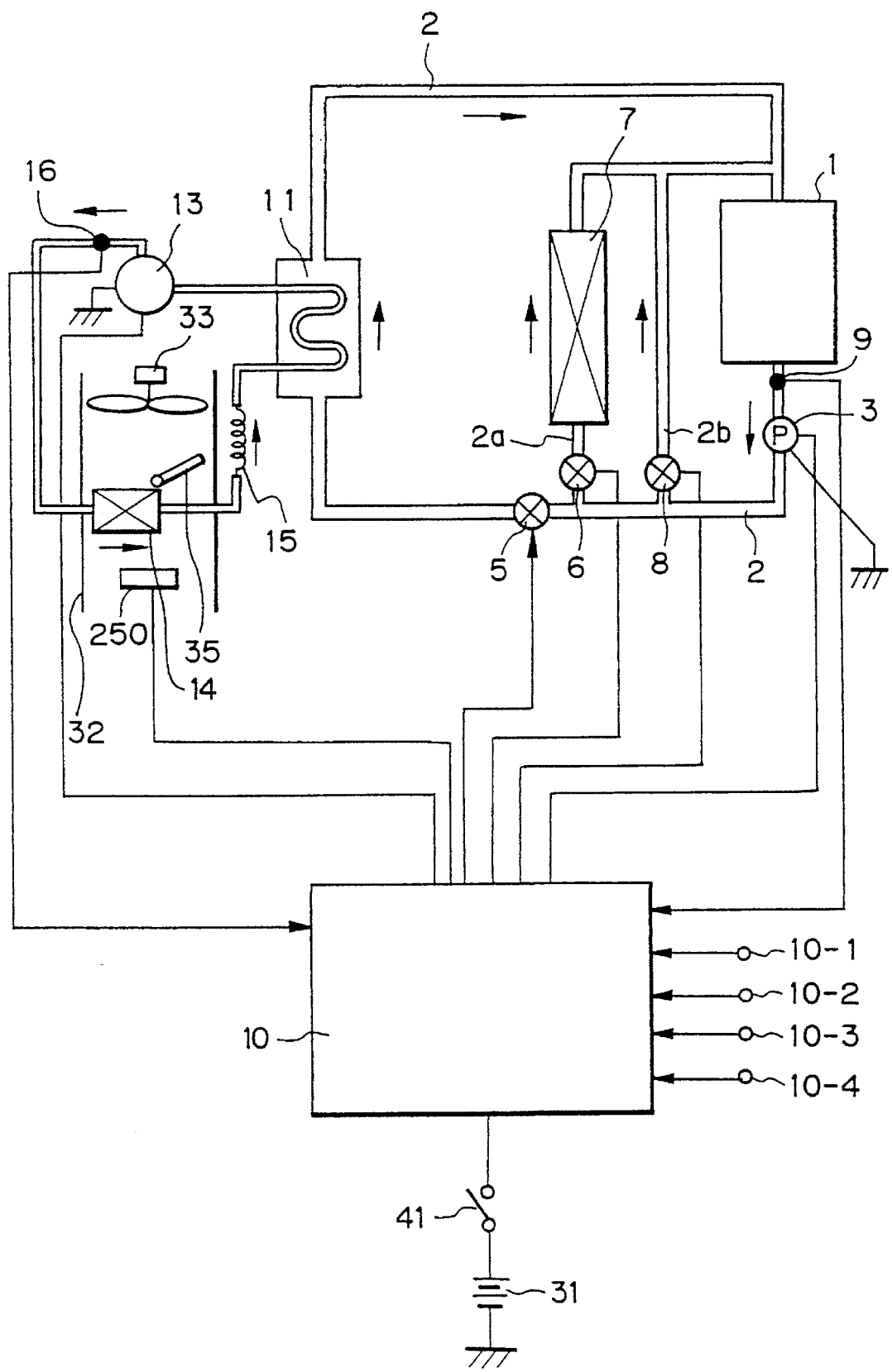
FIG. 4 is a diagrammatic view of a air conditioning system in the second embodiment of the present invention.

FIG. 4 shows a second embodiment, which discloses, over the first embodiment, that an inner heat exchanger 14 in the air duct 32 is provided separately from the engine cooling water recirculation pipe 2, and a water heat exchanging device 11 is provided for obtaining a heat exchange between the engine cooling water and a refrigerating medium in the refrigerating cycle. Namely, the refrigerating cycle of the refrigerating medium is produced by an electrically operated compressor 13, the water heat exchanging device 11, a pressure reduction device 15 and the heater core 14. The fan 33 is arranged upstream of the heater core 14, and the air mix damper 35 is provided for controlling the ratio of the amount of air introduced into the heater core to the total amount of air passing the duct 32. At the outlet of the compressor 13, a sensor 16 is provided for determining the temperature of the refrigerant. The other construction is substantially the same as that in the first embodiment, and therefore an explanation thereof is eliminated though the same numbers for parts performing the same functions are used.

Figure 5:
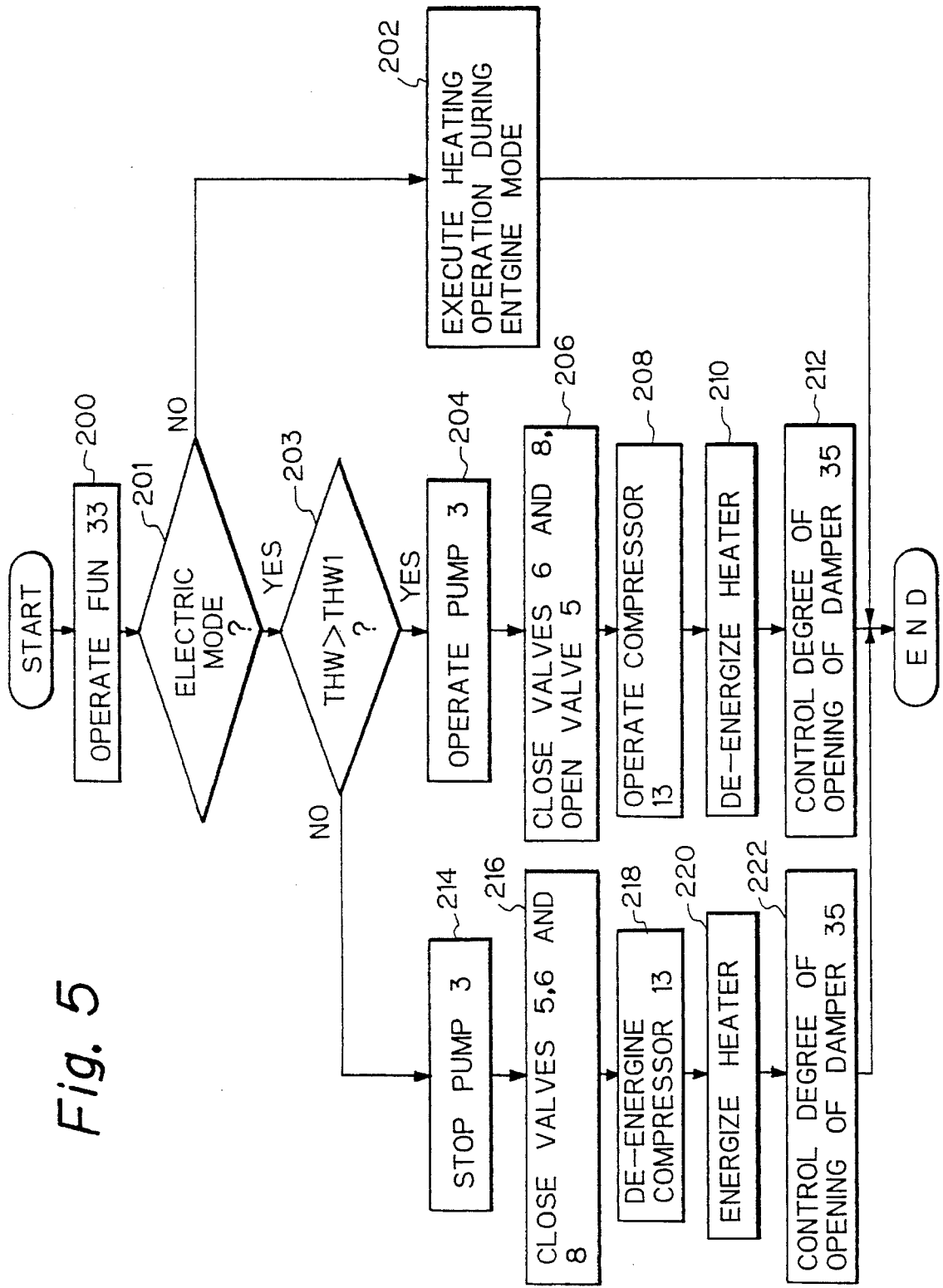
FIG. 5 is a flow chart illustrating how the system in FIG. 4 operates.

The operation of the second embodiment is as follows. The fan 33 is operated during the heating operation (step 200) in FIG. 5. When the engine is operated by the engine 1 (yes result at step 201), a heat exchange is performed at the water heat exchanger 11 between the engine cooling water and the refrigerating medium in the refrigerating cycle, so that the temperature of the refrigerant is increased at the heat exchanger 11. The high temperature refrigerant in a gas state is compressed by the compressor 13 to further increase the temperature of the refrigerant, which is introduced into the inner heat exchanger 14 so that a heat exchange takes place between the refrigerant and the air in the duct 32. As a result, the temperature of the air in the duct increases before it is discharged into the cabin and the temperature of the refrigerant is lowered and attains a liquid state. The degree of opening of the damper 35 is controlled so as to control the amount of air introduced into the heat exchanger 14 and obtain the desired temperature of the air as discharged. The refrigerant at the inner heat exchanger 14 after the heat exchange with the air is introduced into the pressure reduction device 15 where the temperature of the refrigerant, which is introduced into the water heat exchanger 11 is reduced. A heat exchange takes place between the low temperature refrigerant and the high temperature water, which causes a reduction in the temperature of the engine cooling water in the line 2, while the temperature of the refrigerant increases. The heating operation of the air when the vehicle is operated by the engine 1 is generally shown by a block 202 in FIG. 5.

When it is determined that the vehicle is operated by the electric motor M (FIG. 1), a determination is carried out if the temperature of the engine cooling water detected by the sensor 9 is higher than the predetermined value THW1 of, for example, about 40° C. (yes result at step 203), the water-refrigerant heat exchanger 11 allows the refrigerant to absorb heat from the engine cooling water. The pump 2 is operated (step 204), the valves 6 and 8 are closed, and valve 5 is opened, and the compressor 13 is operated (step 208) so that a high temperature gaseous refrigerant is introduced into the inner heat exchanger 14, where a heat exchange takes place between the hot refrigerant and the air flown in the duct 32, so that a flow of air with a higher temperature, which is discharged into the cabin, is obtained. The refrigerant after the heat exchange is cooled to a liquid state. After pressure reduction, the refrigerant is introduced into the heat exchanger 11 for a heat exchange between the low temperature refrigerant and the high temperature engine cooling water. Thus, the refrigerant absorbs heat from the engine cooling water, which is used for repeating the above mentined cycle.

When it is determined that the temperature of the engine cooling water at the refrigerant-water heat exchanger 11 is lower than a predetermined value (no result at step 203), the refrigerant at the heat exchanger 11 cannot receive heat from the engine cooling water. In this case, the refrigerant at the heat exchanger 11 cannot change into a gaseous state, which makes it impossible to operate the refrigerating cycle, which makes it impossible for the air to be heated by the inner heat exchanger 14 at the duct 32. In this case, the microcomputer 10 issues a signal to stop the water pump 3 (step 214), the compressor 13 is stopped (step 218), and an electric heater 250 in the duct 32 is energized for electrically heating the air discharged into the cabin from the duct (step 220).

The pressure sensor 16 is for detection of the pressure of the refrigerant in the refrigerating cycle system. The microcomputer 10 can calculate the temperature of the refrigerant that attains a saturated state, and calculates an estimated value of the temperature of the air after the heat exchange at the inner heat exchanger 14, and this result can be used for determining whether or not the electric heater 250 should be used as a heating source for the air discharged into the cabin.

In this second embodiment, similar to the first embodiment, even if the engine 1 is not operated, the heat from the engine cooling water can be used as a heat source for a heat exchange with the refrigerant at the heat exchanger thereby allowing it to absorb the heat from the water. As a result, power consumption at the compressor 13 for heating the air for temperature control at the cabin can be substantially shortened. Furthermore, the time required for operating the electric heater 250 for carrying out a heating operation of the cabin is eliminated. As a result, an improvement in the running performance of the vehicle can be expected. Furthermore, the second embodiment is advantageous over the first embodiment in that the engine cooling water having a much lower temperature can be used for a heating source of the air for heating the cabin, because the refrigerating line contains a so called heat pump and the heat from the engine cooling water can be effectively absorbed into the refrigerating medium at the heat exchanger 11.

Figure 6:
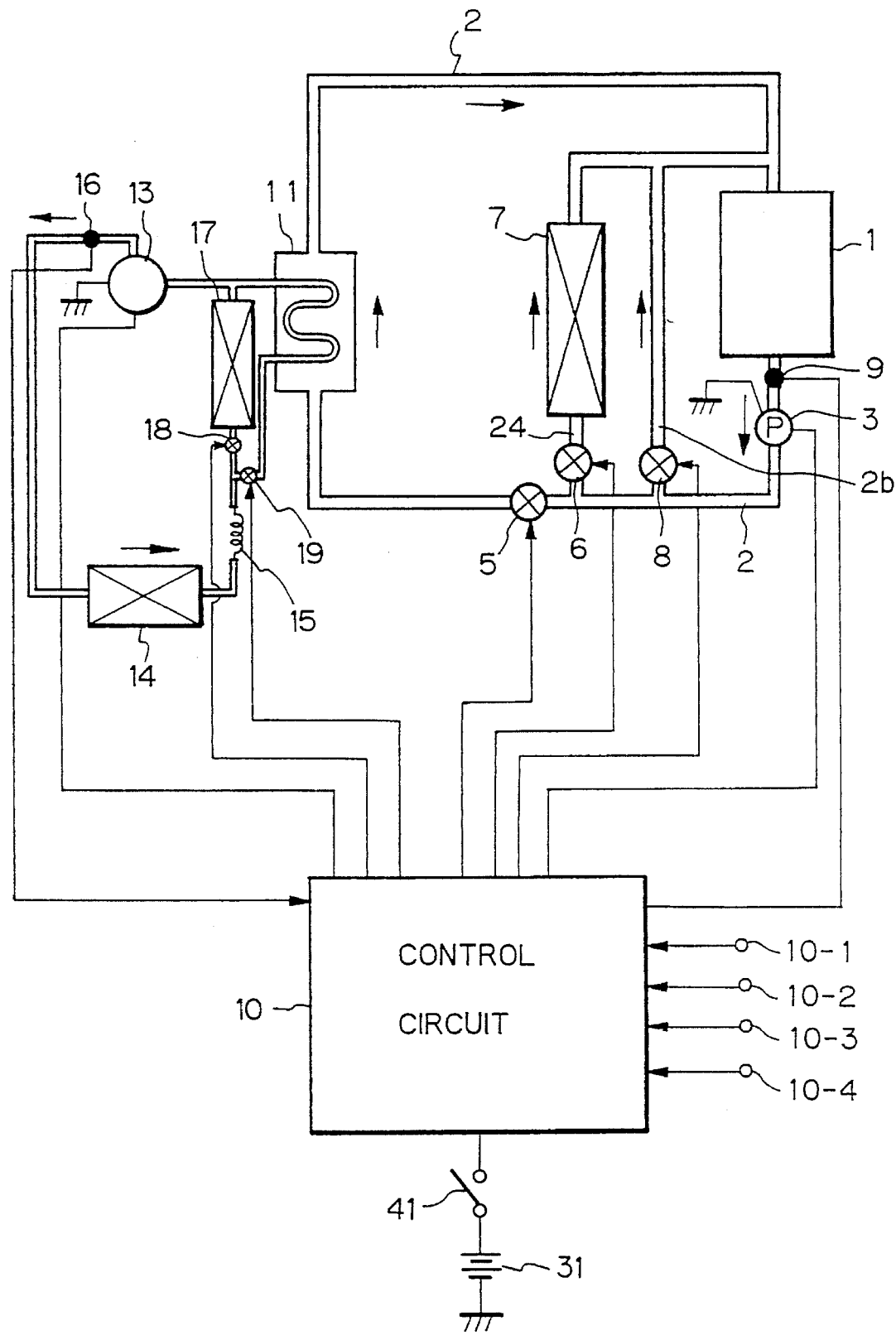
FIGS. 6 to 11 are diagrammatic views of air conditioning systems of respective embodiments of the present invention.

FIG. 6 shows a third embodiment that is similar to FIG. 4, but different therefrom in that an outside heat exchanger 17 is added together with a fourth valve 18 and fifth valve 19. The other construction is the same as that in FIG. 4, and therefore the same reference numerals are used for similar functioning parts, and the detailed explanation thereof is omitted.

In this third embodiment, the outside heat exchanger 17 is parallel with the water-refrigerant heat exchanger 11, and is subjected to a heat transfer with the outside air, which causes heat to be absorbed in the refrigerant also from the outside air, thereby increasing the temperature of the refrigerant flowing into the compressor 13. As a result, the temperature of the gaseous refrigerant from the compressor 13 to the inner heat exchanger 14 increases which increases the heating efficiency of the air heating the cabin. Namely, determination of whether the heat is deprived from the outside air or from the engine cooling water is performed by the microcomputer 10 in accordance with various parameters, such as the temperature of the cooling water and the outside air temperature. Namely, when it is determined that heat should be deprived from the engine cooling water, the microcomputer 10 issues signals so that the fourth valve 18 closes and the fifth valve 19 opens, so that the water-refrigerant heat exchanger 11 is located in the refrigerating line. Contrary to this, when it is determined that the heat should be deprived from the outside air rather than from the engine cooling water, the microcomputer 10 issues signals so that the fourth valve 18 is opened and the fifth valve 19 is closed, so that the outside heat exchanger 17 is located in the refrigerating cycle. When it is determined that the heat should be deprived both from the engine cooling water and from outside air rather than from the engine cooling water, the microcomputer 10 issues signals so that both the fourth and fifth valves 18 and 19 are operated, so that both the water-refrigerant heat exchanger 11 and the outside heat exchanger 17 are located in the refrigerating cycle in parallel formation which allows a large amount of heat to be deprived, so that the heat of the refrigerant after passing the compressor 13 is increased, which increases the temperature of the air heating the cabin after passing the inner heat exchanger 14.

Figure 7:
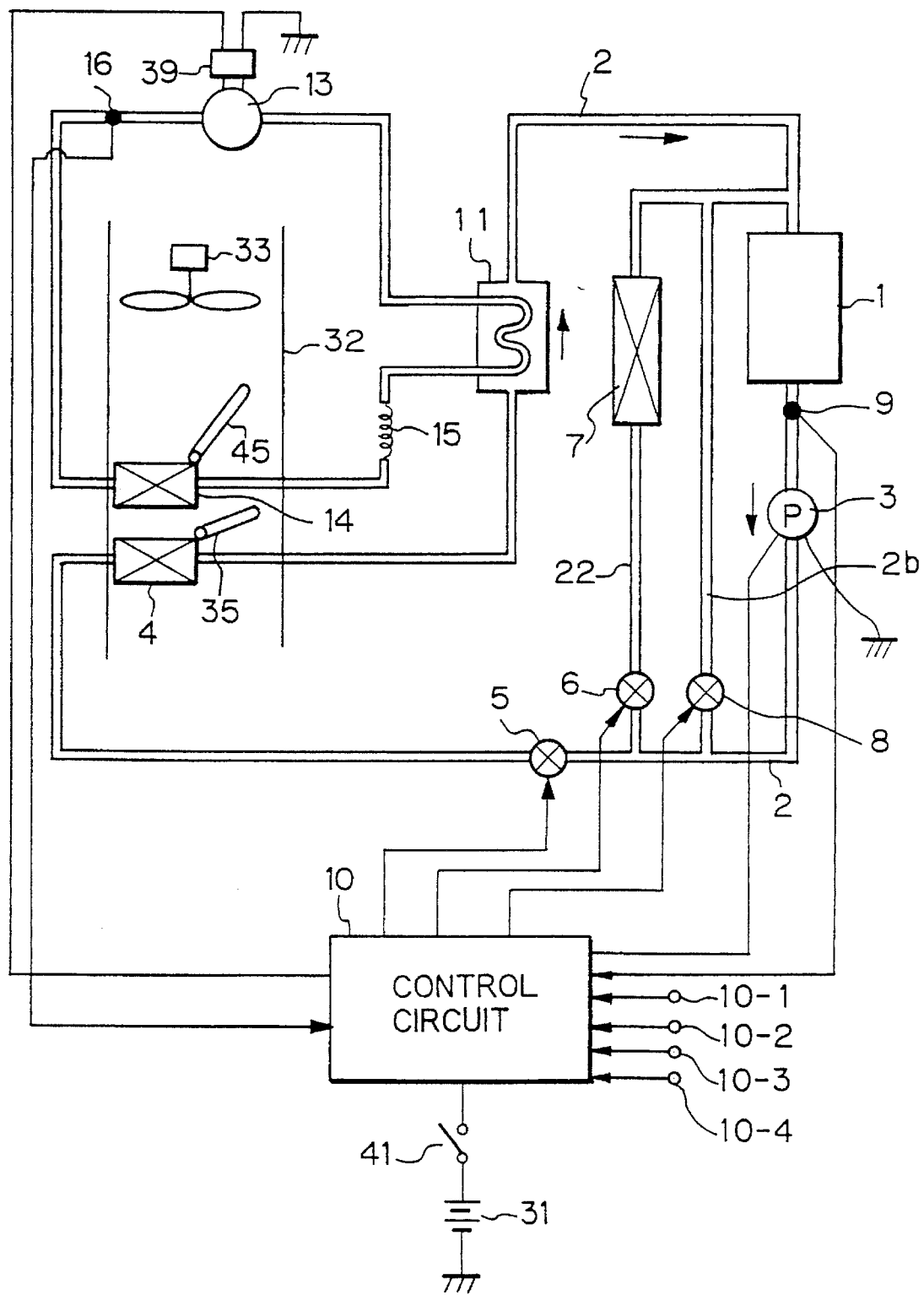

FIG. 7 shows a fourth embodiment of the present invention, wherein the heater core 4 located on the recirculation line 2 of the engine cooling water as in the first embodiment and the water-refrigerant heat exchanger 11 as in the second embodiment are combined. Parts of the same functions as previously explained are designated by the same numbers, and a detailed explanation thereof is omitted. The air mix damper 35 is for controlling the ratio of the amount of air introduced into the heater core 4 to the entire air flow amount in the duct 32. The air mix damper 45 is for controlling the ratio of the amount of air introduced into the inner heat exchanger 14 to the total amount of air passing the duct 32.

In this embodiment, when the vehicle is operated by the internal combustion engine 1, the engine cooling water has a temperature THW larger than a predetermined value, so that the heater core 4 is used for heating the air issued to the cabin and thereby controls the cabin temperature.

When the vehicle is operated by the electric motor M, the heating source is switched in accordance with the temperature of the engine cooling water. Namely, when the temperature of the engine cooling water THW is higher than the predetermined value, such as 40° C., the compressor 13 is stopped so that the refrigerant is prevented from being recirculated through the heat exchanger 11. As a result, the heater core 4 becomes the heating source for heating the air discharged to the cabin. Contrary to this, when the temperature of the engine cooling water is lower than the predetermined value, the compressor 13 is operated and the damper 35 is closed so that the air is passed through the inside heat exchanger 14. Thus, under the same principle as explained with reference to the second and the third embodiments, an increase in the temperature after passing through the inner heat exchanger 14 is obtained for heating the air discharged into the cabin. As will be easily understood, the microcomputer 10 determines if the air should be directed to the heater core 4 or the inner heat exchanger 14. Furthermore, the additional heat exchanger 17 in the third embodiment (FIG. 6) may also be added in this embodiment.

Figure 8:
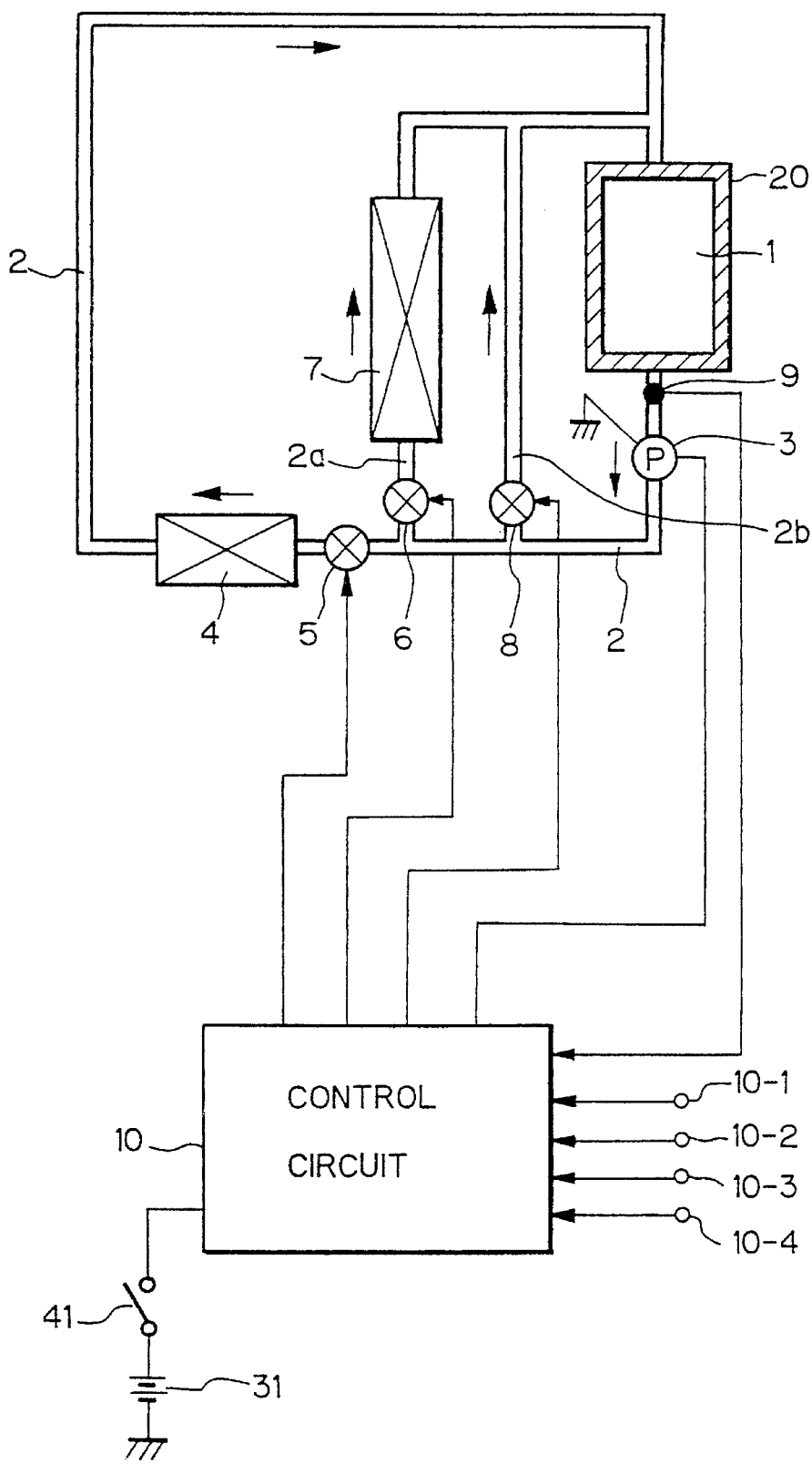

FIG. 8 shows a fifth embodiment, which is different from the embodiments employed the heater core 4 in that the internal combustion engine is, at its outer surface, covered by a layer 20 of a heat insulating material. Such a heat insulating layer 20 can suppress a reduction in the temperature of the cooling water for a relatively long time after the engine 1 has stopped. This means that the time is elongated wherein the engine cooling water is used as a heating source after the internal combustion engine has stopped.

Figure 9:
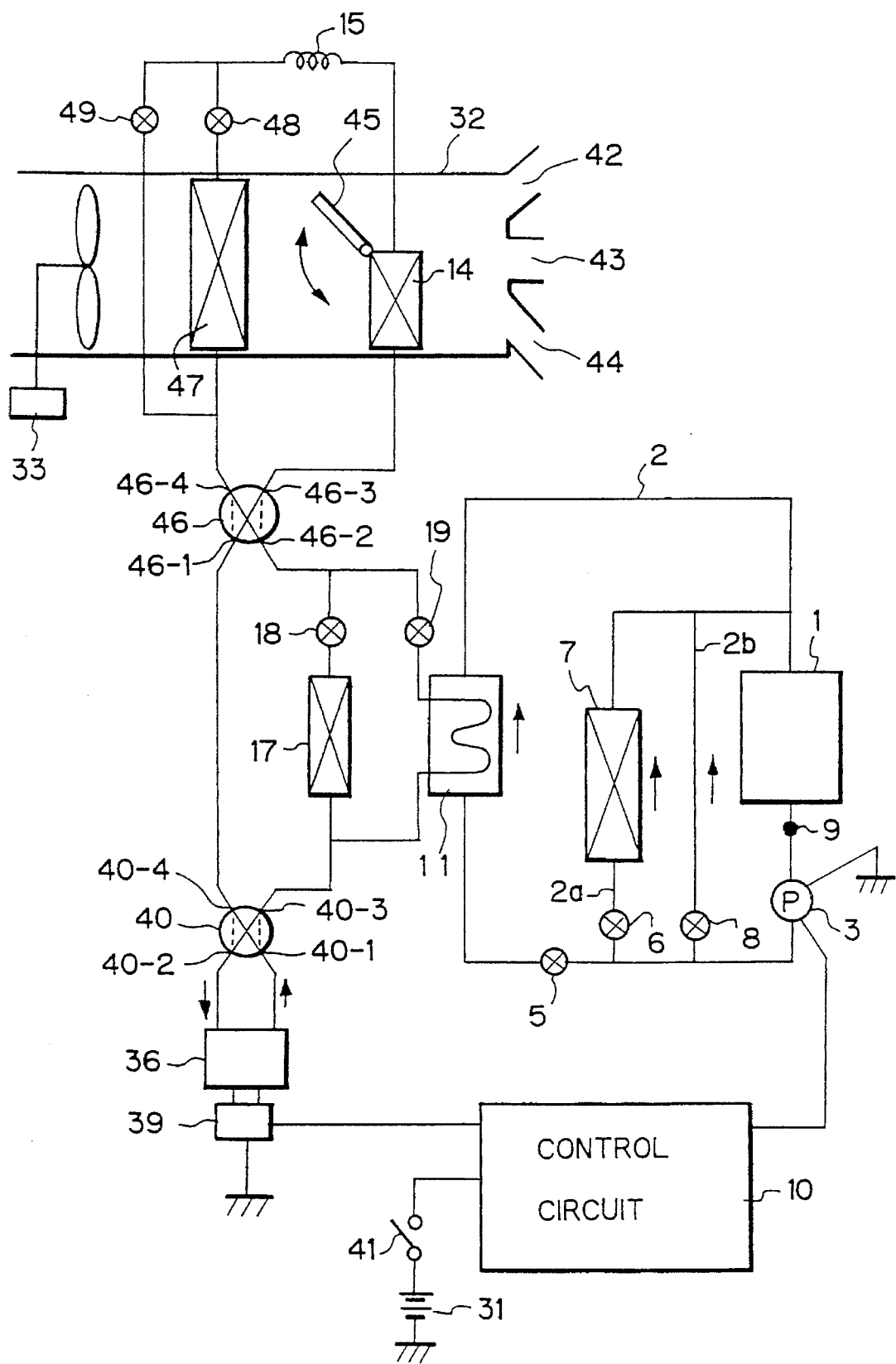

FIG. 9 shows a sixth embodiment that features a combination switching between cooling by the cooling cycle when the temperature of the engine cooling water is high and heating the air using the compressor 36 when the temperature of the engine cooling water is low in the first embodiment, and heating the air by the refrigerant obtained and switched between the water-refrigerant heat exchanger and the outside heat exchanger in the third embodiment. Namely, similar to the first embodiment, the first switching valve 40 as a four port two position valve is, similar to the first embodiment, for switching between the "heater position (solid line)" where the refrigerant from the compressor is introduced into the duct 32 for using the heat generated for heating the air in the duct 32 and the "cooler position (dotted line)" for introducing the refrigerant from the compressor into the water-refrigerant heat exchanger 11 and/or the outside air heat exchanger 17. A second switching valve 46 as a four port two position valve is provided, which has first ports 46-1 connected to the fourth port 40-4 of the first switching valve 40, a second 46-2 connected to the control valve 18 and 19, a third port 46-3 connected to the inside heat exchanger 14, and a fourth port 46-4 connected to a heat exchanger for de-humidifying. The second switching valve 46 is moved between a position where, as shown by solid lines, the first port 46-1 is connected to a third port 40-3, and the second port 46-2 is connected to the fourth port 40-4, and a position where, as shown by dotted lines, the first port 46-1 is connected to the fourth port 40-4, and the second port 46-2 is connected to the third port 40-3. It should be noted that a sixth control valve 48 is arranged between the heat exchanger 47 and the pressure reduction device 15, and a seventh control valve 49 is arranged on a line by-passing the heat exchanger 47 and the sixth valve 48.

In the operation of the embodiment in FIG. 9, when the vehicle is driven by the internal combustion engine 1, in order to cool the air discharged to the cabin, the valve 40 and 46 are switched to the dotted position, and valve 18 is open while valve 19 is closed. Furthermore, the valve 48 is opened and valve 49 is closed. In this case, the outside heat exchanger 17 operates as a condenser for discharging the heat to the outside air, and the inner heat exchanger 47 operates as an evaporator for removing heat from the air.

In order to obtain a heating operation, the first and second switching valves 40 and 46 are switched to positions as shown by the solid lines. Furthermore, the fourth valve 18 is closed, the fifth valve 19 is opened, the sixth valve 48 is closed and the seventh valve 49 is opened. The gaseous high pressure refrigerant from the compressor 36 is recirculated along the ports 40-1 and 40-4 of the switching valve 40, the port 46-1 and 40-3 of the second switching valve 46, the inside heat exchanger 14, the pressure reduction device 15, the ports 46-4 and 46-2 of the second switching valve 46 the heat exchanger 11, and the third and second ports 40-3 and 40-2 of the first switching valve 40. In this case the electric pump 3 is operated, such that the heat exchanger 11 takes heat from the water and the heating efficiency using the compressor 36 is increased thereby reducing the electric power consumption. In the above operation, when the engine 1 is operated, it may be possible that the sixth valve 48 is opened and the seventh valve 49 is closed, which subjects the air passing through the heat exchanger 47 to a de-humidifying operation, so that a dry heating operation can be obtained. Furthermore, the fourth valve 18 is opened while maintaining the opening of the fifth valve 19, which allows for heat absorbed from the outside air thereby increasing heating efficiency.

When the vehicle is operated by the electric motor M, a switching in accordance with the temperature of the engine cooling water is carried out. Namely, when the engine cooling water is hot, the fourth valve 18 is closed and the fifth valve 19 is opened, so that a heat absorbing operation by the heat exchanger 11 is obtained. Furthermore, the fourth and fifth valves 18 and 19 can both be opened for obtaining a heat absorbing operation from both heat exchangers 11 and 17. When the temperature of the engine cooling water becomes lower than the outside air temperature, the fourth valve 18 is opened and the fifth valve 19 is closed so that only a heat absorbing operation from the outside air is carried out.

In order to attain a cooling operation when the vehicle wheels are driven by the electric motor M, both switching valves 40 and 46 are switched to the positions as shown by the dotted lines. Furthermore, the fourth valve 18 is opened, the fifth valve 19 is closed, the sixth valve 48 is opened, and the seventh valve 49 is closed. As a result, the high pressure, hot refrigerant from the compressor 36 is introduced into the outside heat exchanger 17 for emitting heat to the outside. The refrigerant is then introduced into the inner heat exchanger 14, while the amount of heat emission at the heat exchanger 14 can be controlled by the degree of opening of the air mix damper 45. As a pressure reduction device 15, the pressure of the refrigerant is reduced, and is directed to the heat exchanger 47 for de-humidifying, where the air passing through the duct is cooled and de-humidified. Then the refrigerant is returned to the compressor for repeating the above mentioned refrigerating cycle.

In the above case, the fourth valve 18 is opened and the fifth valve 19 is closed for heat emission of the refrigerant after the compressor 36 and only at the heat exchanger 17. However, as a substitute manner of operation, the fifth valve 19 is further opened so that heat emission takes place at the water-refrigerant heat exchanger 11, which can increase the temperature of the engine cooling water, which can shorten the warming up time when the engine is re-started soon after.

Figure 10:
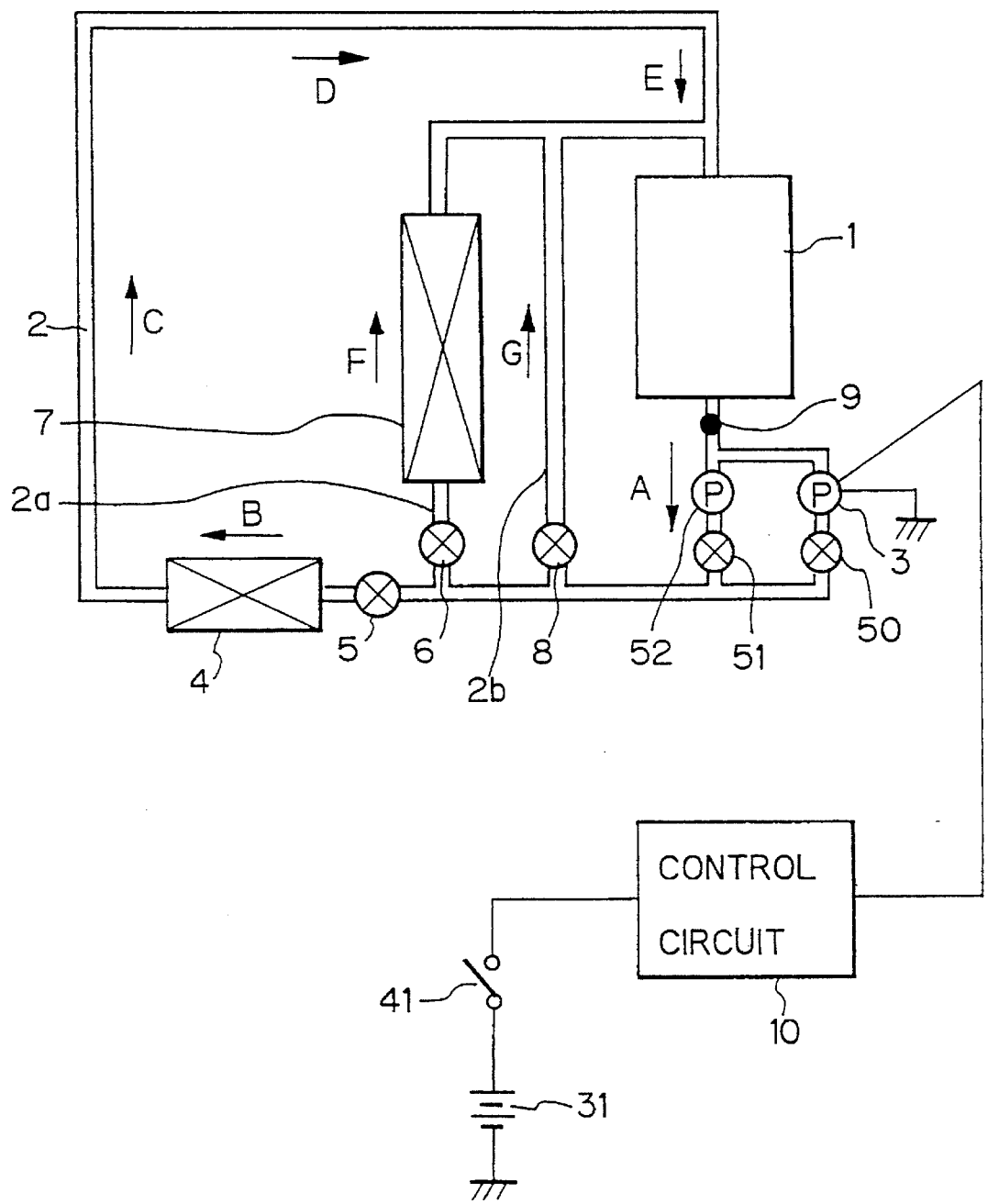

FIG. 10 shows a seventh embodiment that features, over the first embodiment in FIG. 2, a mechanically operated pump 52 connected to a crankshaft of the engine 1 that is parallel to the electric driven water pump 3 operated by the battery 31. The other construction is the same as that in FIG. 1, and therefore is omitted in the drawing. Arranged in series to the electric pump 3 and the mechanical pump 52, respectively, are control valves 50 and 51. When the vehicle is operated by the engine 1, the valve 50 is closed and the valve 51 is opened, so that the mechanical pump 52 can execute the recirculation operation of the engine cooling water. In this case, the electric pump 3 is not energized.

When the vehicle wheels are operated by the electric motor M, the mechanical pump 52 is not, of course, operated because the engine 1 is stopped. In this case, the valve 50 is opened and the valve 51 is closed, so that the electrically operated pump 3 executes the engine water recirculation operation.

In this seventh embodiment in FIG. 10, when the engine 1 operates the vehicle, the recirculation of the engine cooling water is performed by the engine 1, which allows the electric power consumption to be correspondingly reduced, which compares with the first to the sixth embodiments. Furthermore, when the recirculation of the engine water is performed by the engine operated pump 51, the electric pump 3 is disconnected from the flow of the engine cooling water by the valve 51 when closed, and when the recirculation of the engine water is performed by the electric pump 3, the mechanical pump 51 is disconnected from the flow of the engine cooling water by the valve 50 when closed. As a result, a reduction in flow resistance in the engine cooling water in the water recirculation passageway can be obtained.

Figure 11:
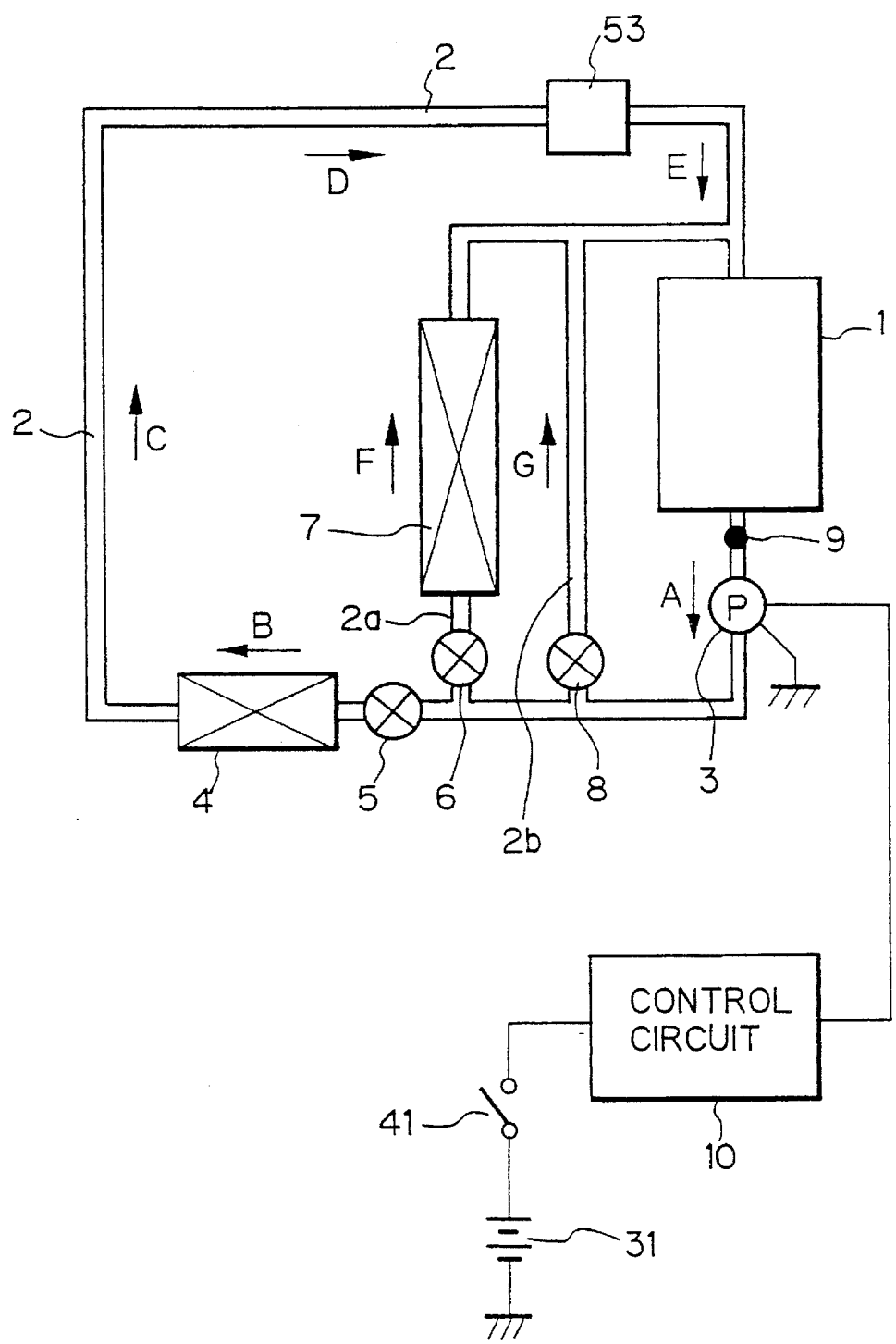

FIG. 11 shows an eighth embodiment that features an electric heater 53 powered by an outside power source, such as a wall socket, provided in the recirculation passageway 2. The other construction is the same as that in FIG. 1, and is not shown for the sake of simplicity. The heater 53 can be operated at night for increasing the temperature of the engine cooling water. In this case, high temperature engine cooling water is obtained in the morning, which allows the engine cooling water to be used instantly as the heating source for heating the cabin when the vehicle is operated by the electric motor.

It should be noted that, in the first to seventh embodiments, it may be possible for the engine to be used solely for operating a generator for generating electric power, which is charged to the battery for supplementing the electric power consumed when the vehicle is moved.

While the embodiments of the present inventions are described with reference to attached drawings, many modifications and changes can be made by those skilled in the art without departing from the scope and spirit of the present invention.

We claim:

1. A hybrid vehicle selectively powered by either electric power or internal combustion engine power, and having a cabin to be temperature controlled, comprising:

a water cooled internal combustion engine generating a rotational movement for moving the vehicle, said engine being provided with a water recirculation line for heat exchanging between the engine cooling water and outside air for cooling said engine;

a battery for generating electric power;

an electric motor connected to said battery and generating a rotational movement for moving the vehicle during a time when said engine is turned off;

a duct having a first end for introduction of air and a second end opened to the cabin for discharging the air thereinto;

a heat exchanging means arranged in said duct and connected to said engine cooling water recirculation line to guide the engine cooling water into the heat exchanging means for increasing a temperature of the air discharged into the cabin from said second end of the duct, when said electric motor is activated by said battery for driving the vehicle;

temperature detecting means for detecting the temperature of the engine cooling water, and;

recirculating means for recirculating the engine cooling water through said water recirculation line, said engine and said heat exchanging means, said recirculating means being activated by said battery when said engine is turned off and said electric motor is turned on to move the vehicle and the detected temperature of the engine cooling water is higher than a predetermined value, so that the heated engine cooling water from the engine cooling water recirculation line is recirculated to the heat exchanging means when the hybrid vehicle is driven by the electric motor.

2. A vehicle according to claim 1, wherein said means for obtaining a forced flow of engine cooling water is a water pump operated by the battery.

3. A hybrid vehicle according to claim 1, further comprising controlling means for controlling the amount of the engine cooling water flowing into said heat exchanging means.

4. A vehicle having a cabin to be temperature controlled comprising:

a battery for generating electric power;

an electric motor connected to the battery which produces rotational movement for moving the vehicle;

a water cooled internal combustion engine;

the engine being provided with a water recirculation line for obtaining a heat exchange between engine cooling water and the outside air, for cooling the engine;

a duct having one end for the introduction of air and a second end opened to the cabin of the vehicle for discharging the air thereinto, a heat exchanging means cooperating with the engine cooling water in the engine cooling water recirculation line for increasing the temperature of the air discharged into the cabin from said second end of the duct when the battery operates the electric motor for driving the vehicle, said heat exchanging means comprises a passageway connected to the engine water recirculation line, a means for obtaining a forced flow of the engine cooling water in said passageway, and a heat exchanger arranged in the duct for obtaining a heat exchange between the engine water and the air passing through the duct for increasing the temperature of the air discharged into the cabin from the second end of the duct, said heat exchanging means comprises an independent closed passageway in which a heat exchanging medium passes, means for co-operating with the engine cooling water for absorbing heat from the engine cooling water to said heat exchanging medium, a means for generating a forced flow of the heat exchanging medium in the closed passageway, and a first heat exchanger arranged in the duct for obtaining a heat exchange of the heat exchange medium with the air passing through the duct for increasing the temperature of the air discharged into the cabin from the second end of the duct, said heat absorbing means comprises an additional passageway having one end connected to the engine cooling water recirculating line for coupling an amount of water into the additional passageway and a second end connected to the engine cooling water recirculating line for returning the water into the engine cooling water recirculating line, and a second heat exchanger for obtaining a heat exchange between the water and the heat exchange medium in said additional passageway, and;

an additional heat exchanger arranged in the additional passageway; the additional heat exchanger being arranged in the duct for obtaining a heat exchange of the engine cooling water with the air passing through the duct.

5. A vehicle according to claim 4, further comprising a third heat exchanger located in said close passageway for the cooling medium parallel with said second heat exchanger so that a heat exchange in said third heat exchanger occurs between the outside air and the heat exchange medium.

6. A vehicle according to claim 1, wherein said means for obtaining a forced flow is a compressor operated by the battery arranged downstream from the heat absorbing means and upstream from the first heat exchanger, and further comprises a pressure reducing device arranged downstream from the first heat exchanger and upstream from the heat absorbing means.

7. A vehicle having a cabin to be temperature controlled comprising:

a battery for generating electric power;

an electric motor connected to the battery;

a water cooled internal combustion engine;

the engine being provided with a water recirculation line for obtaining a heat exchange between engine cooling water and the outside air for cooling the engine;

the rotational movement being produced at least from the electric motor, and being used for moving the vehicle;

a duct having one end for the introduction of air and a second end opened to the cabin of the vehicle for discharging the air thereinto;

a heat exchanging means cooperating with the engine cooling water in the engine cooling water recirculation line for increasing the temperature of the air discharged into the cabin from said second end of the duct when the battery operates the electric motor for driving the vehicle, and an electric heater arranged in the water recirculation line of the engine, and means for operating the electric heater for a predetermined period when the vehicle is at rest.

8. A vehicle having a cabin to be temperature controlled comprising:

a battery for generating electric power;

an electric motor connected to the battery for receiving electric power therefrom for obtaining a rotational movement for driving the vehicle when it is required;

a water cooled internal combustion engine for obtaining a rotational movement for driving vehicle when it is required;

the engine being provided with a water recirculation line for obtaining a heat exchange between engine cooling water and the outside air for cooling the engine;

a duct having one end for introduction of the air and a second end opened to the cabin of the vehicle for discharging the air thereinto;

a first heat exchanger in which the engine cooling water passes and which is arranged in the duct for heating the air passing through the duct;

a second heat exchanger arranged upstream from the first heat exchanger, through which a refrigerant passes;

a sensor means for detection of the temperature of the cooling water, and;

means, responsive to the temperature of the engine cooling water when the battery operates the vehicle, for co-operating with the second heat exchanger which is, in accordance with the operating conditions of the vehicle, switched between a first state where a refrigerating cycle is created for decreasing the temperature of the air directed to the second heat exchanger, and a second state where a heat pump is created for increasing the temperature of the air in the duct directed to the cabin.

9. A vehicle according to claim 8, wherein said first heat exchanger is connected to the engine cooling water line for receiving an amount of engine cooling water therefrom, and wherein said co-operating means comprises a compressor operated by the battery, a third exchanger for obtaining a heat exchange between the refrigerant and the outside air, a pressure reduction device, and a switching valve that moves between a position where the compressor, the third heat exchanger, the pressure reduction device, and the second heat exchanger construct the refrigerating cycle, and a second position where the compressor, the second heat exchanger, the pressure reduction device, and the third heat exchanger construct the heat pump.

10. A vehicle having a cabin to be temperature, controlled comprising:

a battery for generating electric power;

an electric motor connected to the battery for receiving electric power therefrom for obtaining a rotational movement for driving the vehicle when it is required;

a water cooled internal combustion engine for obtaining a rotational movement for driving vehicle when it is required;

the engine being provided with a water recirculation line for obtaining a heat exchange between an engine cooling water and the outside air for cooling the engine;

a duct having one end for introduction of the air and a second end opened to the cabin of the vehicle for discharging the air thereinto;

a first heat exchanger arranged in the duct for a heat exchange between a refrigerant and the air passing through the duct;

a second heat exchanger arranged in the duct for a heat exchange between a refrigerant and the air passing through the duct;

a third heat exchanger for heat exchange between a refrigerant with a refrigerant medium and the engine cooling water;

a pressure reduction device;

a compressor operated by the battery;

a first switching valve switched between a position where the refrigerant from the compressor is introduced into the third heat exchanger and a position where the refrigerant from the second heat exchanger is received by the compressor, and;

a second switching valve switched between a position where the refrigerant from the third heat exchanger is introduced into the first heat exchanger and a position where the refrigerant from the second heat exchanger is received by the third heat exchanger;

the selection of the positions of the first and the second switching valve when the battery operates the vehicle being such that a refrigerating cycle is created by a flow of refrigerant in such a manner that heat from the refrigerant is radiated at the third heat exchanger to the engine cooling water and heat is absorbed by the refrigerant from the air passing the duct at the second heat exchanger, when an air cooling operation is required, and a heat pump cycle is created by a flow of the refrigerant in such a manner that heat from the engine cooling water is absorbed at the third heat exchanger and heat from the refrigerant is radiated to the air passing the duct at the first heat exchanger when heating the air is required.

11. A vehicle according to claim 10, further a valve means for selectively introducing the refrigerant through the second heat exchanging means for allowing the second heat exchanger to selectively function as a de-humidifier when heating is carried out by the first heat exchanger.

12. A vehicle according to claim 10, further comprising a fourth heat exchanger arranged parallel to the third heat exchanger; the fourth heat exchanger being for obtaining a heat exchange between the refrigerant and the outside air.

13. A vehicle according to claim 8, further comprising an electric heater connectible to the battery and arranged in said duct, means for detection of the temperature of the engine cooling water, and means for allowing the operation of the electric heater by the battery when the temperature of the cooling water as detected is smaller than a predetermined value.

14. A vehicle according to claim 8, further comprising a layer of heat insulating material arranged substantially around the engine.

15. A vehicle according to claim 10, further comprising an electric heater connectable to the battery and arranged in said duct, means for detecting the temperature of the engine cooling water, and means for allowing the operation of the electric heater by the battery when the temperature of the cooling water as detected is smaller than a predetermined value.

16. A vehicle according to claim 10, further comprising a layer of heat insulating material arranged substantially around the engine.

17. A vehicle according to claim 10, further comprising an electric heater connectable to the battery and arranged in the water recirculation line of the engine, and means for operating the electric heater for a predetermined period when the vehicle is at rest.

18. A vehicle having a cabin to be temperature controlled comprising:
a battery for generating electric power;
an electric motor connected to the battery;
a water cooled internal combustion engine;
the engine being provided with a water recirculation line for obtaining a heat exchange between engine cooling water and the outside air for cooling the engine;
rotational movement being produced at least from the electric motor, and being used for moving the vehicle;
a duct having one end for the introduction of air and a second end opened to the cabin of the vehicle for discharging the air thereinto;
a heat exchanging means cooperating with the engine cooling water in the engine cooling water recirculation line for increasing the temperature of the air discharged into the cabin from said second end of the duct when the battery operates the electric motor for driving the vehicle, said heat exchanging means comprises a passageway connected to the engine water recirculation line, an electric-operated water pump, operated by a battery to force the engine cooling water in said passageway, and a heat exchanger element arranged in the duct for heat exchanging between the engine water and the air passing through the duct for increasing the temperature of the air discharged into the cabin from the second end of the duct; and
a water pump that is arranged parallel to said electric operated water pump and is operated mechanically by the internal combustion engine.

19. A hybrid vehicle selectively powered by either electric power or engine power, and having a cabin to be temperature controlled, comprising:
a water cooled engine being provided with a water recirculation line for heat exchanging between the engine cooling water and outside air for cooling said engine;
a battery for generating electric power;
an electric motor connected to said battery and generating a rotational movement for moving the vehicle during a time when said engine is turned off;
a duct having a first end for introduction of air and a second end opened to the cabin for discharging the air thereinto;
a heat exchanging means arranged in said duct and connected to said engine cooling water recirculation line to guide the engine cooling water into the heat exchanging means for increasing a temperature of the air discharged into the cabin from said second end of the duct, when said electric motor is activated by said battery for driving the vehicle;
temperature detecting means for detecting the temperature of the engine cooling water, and;
recirculating means for recirculating the engine cooling water through said water recirculation line, said engine and said heat exchanging means, said recirculating means being activated by said battery when said engine is turned off and said electric motor is turned on to move the vehicle and the detected temperature of the engine cooling water is higher than a predetermined value, so that the heated engine cooling water from the engine cooling water recirculation line is recirculated to the heat exchanging means when the hybrid vehicle is driven by the electric motor.

20. A hybrid vehicle according to claim 19, wherein said engine generates a rotational movement for moving the vehicle when the electric motor is turned off.

21. A hybrid vehicle according to claim 19, wherein said engine is used for operating a generator for generating an electric power for at least one of said battery and said electric motor.

22. A vehicle having a cabin to be temperature controlled comprising:
a battery for generating electric power;
an electric motor connected to the battery receiving electric power therefrom for obtaining a rotational movement for driving the vehicle when it is required;
a water cooled engine being provided with a water recirculation line for obtaining a heat exchange between engine cooling water and the outside air for cooling the engine;
a duct having one end for introduction of the air and a second end opened to the cabin of the vehicle for discharging the air thereinto;
a first heat exchanger in which the engine cooling water passes and which is arranged in the duct for heating the air passing through the duct;

a second heat exchanger arranged in the duct, through which a refrigerant passes;

a sensor means for detection of the temperature of the cooling water, and;

means, responsive to the temperature of the engine cooling water when the battery operates the vehicle, for cooperating with the second heat exchanger which is, in accordance with the operating conditions of the vehicle, switched between a first state where a refrigerating cycle is created for decreasing the temperature of the air directed to the second heat exchanger, and a second state where a heat pump is created for increasing the temperature of the air in the duct directed to the cabin.

23. A hybrid vehicle according to claim 22, wherein said engine generates a rotational movement for moving the vehicle when the electric motor is turned off.

24. A hybrid vehicle according to claim 22, wherein said engine is used for operating a generator for generating an electric power for at least one of said battery and said electric motor.

25. A vehicle according to claim 7, wherein said electric heater is powered by an outside power source.

* * * * *